US 9,405,765 B1

(12) United States Patent
Natanzon

(10) Patent No.: US 9,405,765 B1
(45) Date of Patent: Aug. 2, 2016

(54) REPLICATION OF VIRTUAL MACHINES

(71) Applicant: EMC Corporation, Hopkinton, MA (US)

(72) Inventor: Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 186 days.

(21) Appl. No.: 14/108,473

(22) Filed: Dec. 17, 2013

(51) Int. Cl.
*G06F 17/30* (2006.01)

(52) U.S. Cl.
CPC .... *G06F 17/30174* (2013.01); *G06F 17/30238* (2013.01)

(58) Field of Classification Search
CPC ............ G06F 11/1004; G06F 11/1456; G06F 11/1451; G06F 9/45558; G06F 17/30221; G06F 17/30156; G06F 17/30233
USPC ............. 714/15; 707/610, 646; 711/155, 162; 718/1
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Apr. 29, 1991; p. 1.

(Continued)

*Primary Examiner* — William Spieler
(74) *Attorney, Agent, or Firm* — Daly, Crowley, Mofford & Durkee, LLP

(57) ABSTRACT

In one aspect, a method includes intercepting, at a file system level, an I/O directed to a file representing a virtual volume to be replicated to a replica volume at a replica site, translating a file offset of the file to a volume offset of the replica volume; and replicating the I/O to a replica volume using the volume offset.

19 Claims, 6 Drawing Sheets

(56) References Cited

U.S. PATENT DOCUMENTS

| | | | |
|---|---|---|---|
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,159,088 B2 | 1/2007 | Hirakawa et al. | |
| 7,167,963 B2 | 1/2007 | Hirakawa et al. | |
| 7,203,741 B2 | 4/2007 | Marco et al. | |
| 7,222,136 B1 | 5/2007 | Brown et al. | |
| 7,296,008 B2 | 11/2007 | Passerini et al. | |
| 7,328,373 B2 | 2/2008 | Kawamura et al. | |
| 7,353,335 B2 | 4/2008 | Kawamura | |
| 7,360,113 B2 | 4/2008 | Anderson et al. | |
| 7,426,618 B2 | 9/2008 | Vu et al. | |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,590,887 B2 | 9/2009 | Kano | |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,719,443 B1 | 5/2010 | Natanzon | |
| 7,757,057 B2 | 7/2010 | Sangapu et al. | |
| 7,774,565 B2 | 8/2010 | Lewin et al. | |
| 7,797,358 B1 | 9/2010 | Ahal et al. | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,849,361 B2 | 12/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,205,009 B2 | 6/2012 | Heller et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |
| 8,521,691 B1 | 8/2013 | Natanzon | |
| 8,521,694 B1 | 8/2013 | Natanzon | |
| 8,543,609 B1 | 9/2013 | Natanzon | |
| 8,583,885 B1 | 11/2013 | Natanzon | |
| 8,600,945 B1 | 12/2013 | Natanzon et al. | |
| 8,601,085 B1 | 12/2013 | Ives et al. | |
| 8,627,012 B1 | 1/2014 | Derbeko et al. | |
| 8,683,592 B1 | 3/2014 | Dotan et al. | |
| 8,689,047 B2 * | 4/2014 | Kotagiri | G06F 11/1004 714/15 |
| 8,694,700 B1 | 4/2014 | Natanzon et al. | |
| 8,706,700 B1 | 4/2014 | Natanzon et al. | |
| 8,712,962 B1 | 4/2014 | Natanzon et al. | |
| 8,719,497 B1 | 5/2014 | Don et al. | |
| 8,725,691 B1 | 5/2014 | Natanzon | |
| 8,725,692 B1 | 5/2014 | Natanzon et al. | |
| 8,726,066 B1 | 5/2014 | Natanzon et al. | |
| 8,738,813 B1 | 5/2014 | Natanzon et al. | |
| 8,745,004 B1 | 6/2014 | Natanzon et al. | |
| 8,751,828 B1 | 6/2014 | Raizen et al. | |
| 8,769,336 B1 | 7/2014 | Natanzon et al. | |
| 8,805,786 B1 | 8/2014 | Natanzon | |
| 8,806,161 B1 | 8/2014 | Natanzon | |
| 8,825,848 B1 | 9/2014 | Dotan et al. | |
| 8,832,399 B1 | 9/2014 | Natanzon et al. | |
| 8,850,143 B1 | 9/2014 | Natanzon | |
| 8,850,144 B1 | 9/2014 | Natanzon et al. | |
| 8,862,546 B1 | 10/2014 | Natanzon et al. | |
| 8,892,835 B1 | 11/2014 | Natanzon et al. | |
| 8,898,112 B1 | 11/2014 | Natanzon et al. | |
| 8,898,409 B1 | 11/2014 | Natanzon et al. | |
| 8,898,515 B1 | 11/2014 | Natanzon | |
| 8,898,519 B1 | 11/2014 | Natanzon et al. | |
| 8,914,595 B1 | 12/2014 | Natanzon | |
| 8,924,668 B1 | 12/2014 | Natanzon | |
| 8,930,500 B2 | 1/2015 | Marco et al. | |
| 8,930,947 B1 | 1/2015 | Derbeko et al. | |
| 8,935,498 B1 | 1/2015 | Natanzon | |
| 8,949,180 B1 | 2/2015 | Natanzon et al. | |
| 8,954,673 B1 | 2/2015 | Natanzon et al. | |
| 8,954,796 B1 | 2/2015 | Cohen et al. | |
| 8,959,054 B1 | 2/2015 | Natanzon | |
| 8,977,593 B1 | 3/2015 | Natanzon et al. | |
| 8,977,826 B1 | 3/2015 | Meiri et al. | |
| 8,996,460 B1 | 3/2015 | Frank et al. | |
| 8,996,461 B1 | 3/2015 | Natanzon et al. | |
| 8,996,827 B1 | 3/2015 | Natanzon | |
| 9,003,138 B1 | 4/2015 | Natanzon et al. | |
| 9,026,696 B1 | 5/2015 | Natanzon et al. | |
| 9,031,913 B1 | 5/2015 | Natanzon | |
| 9,032,160 B1 | 5/2015 | Natanzon et al. | |
| 9,037,818 B1 | 5/2015 | Natanzon et al. | |
| 9,063,994 B1 | 6/2015 | Natanzon et al. | |
| 9,069,479 B1 | 6/2015 | Natanzon | |
| 9,069,709 B1 | 6/2015 | Natanzon et al. | |
| 9,081,754 B1 | 7/2015 | Natanzon et al. | |
| 9,081,842 B1 | 7/2015 | Natanzon et al. | |
| 9,087,008 B1 | 7/2015 | Natanzon | |
| 9,087,112 B1 | 7/2015 | Natanzon et al. | |
| 9,104,529 B1 | 8/2015 | Derbeko et al. | |
| 9,110,914 B1 * | 8/2015 | Frank | G06F 17/30156 |
| 9,116,811 B1 | 8/2015 | Derbeko et al. | |
| 9,128,628 B1 | 9/2015 | Natanzon et al. | |
| 9,128,855 B1 | 9/2015 | Natanzon et al. | |
| 9,134,914 B1 | 9/2015 | Derbeko et al. | |
| 9,135,119 B1 | 9/2015 | Natanzon et al. | |
| 9,135,120 B1 | 9/2015 | Natanzon | |
| 9,146,878 B1 | 9/2015 | Cohen et al. | |
| 9,152,339 B1 | 10/2015 | Cohen et al. | |
| 9,152,578 B1 | 10/2015 | Saad et al. | |
| 9,152,814 B1 | 10/2015 | Natanzon | |
| 9,158,578 B1 | 10/2015 | Derbeko et al. | |
| 9,158,630 B1 | 10/2015 | Natanzon | |
| 9,160,526 B1 | 10/2015 | Raizen et al. | |
| 9,177,670 B1 | 11/2015 | Derbeko et al. | |
| 9,189,339 B1 | 11/2015 | Cohen et al. | |
| 9,189,341 B1 | 11/2015 | Natanzon et al. | |
| 9,201,736 B1 | 12/2015 | Moore et al. | |
| 9,223,659 B1 | 12/2015 | Natanzon et al. | |
| 9,225,529 B1 | 12/2015 | Natanzon et al. | |
| 9,235,481 B1 | 1/2016 | Natanzon et al. | |
| 9,235,524 B1 | 1/2016 | Derbeko et al. | |
| 9,235,632 B1 | 1/2016 | Natanzon | |
| 9,244,997 B1 | 1/2016 | Natanzon et al. | |
| 9,251,020 B1 * | 2/2016 | Kalekar | G06F 11/2066 |
| 9,256,605 B1 | 2/2016 | Natanzon | |
| 9,274,718 B1 | 3/2016 | Natanzon et al. | |
| 9,275,063 B1 | 3/2016 | Natanzon | |
| 9,286,052 B1 | 3/2016 | Solan et al. | |
| 9,305,009 B1 | 4/2016 | Bono et al. | |
| 9,323,750 B2 | 4/2016 | Natanzon et al. | |
| 9,330,155 B1 | 5/2016 | Bono et al. | |
| 9,336,094 B1 | 5/2016 | Wolfson et al. | |
| 9,336,230 B1 | 5/2016 | Natanzon | |

(56) References Cited

U.S. PATENT DOCUMENTS

| | | |
|---|---|---|
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2006/0212462 A1 | 9/2006 | Heller et al. |
| 2007/0055833 A1 | 3/2007 | Vu et al. |
| 2007/0162513 A1 | 7/2007 | Lewin et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2007/0220311 A1 | 9/2007 | Lewin et al. |
| 2007/0266053 A1 | 11/2007 | Ahal et al. |
| 2008/0082591 A1 | 4/2008 | Ahal et al. |
| 2008/0082592 A1 | 4/2008 | Ahal et al. |
| 2008/0082770 A1 | 4/2008 | Ahal et al. |
| 2010/0169587 A1* | 7/2010 | Atluri .............. G06F 11/1456 711/155 |
| 2011/0113012 A1* | 5/2011 | Gruhl .............. G06F 11/1451 707/646 |
| 2013/0117223 A1* | 5/2013 | Niki .............. G06F 17/30221 707/610 |
| 2014/0365740 A1* | 12/2014 | Vasilyev .............. G06F 11/1451 711/162 |
| 2015/0106802 A1* | 4/2015 | Ivanov .............. G06F 9/45558 718/1 |

OTHER PUBLICATIONS

Soules "Metadata Efficiency in Versioning File Systems;" 2003; pp. 1-16.

AIX System Management Concepts: Operating Systems and Devices; May 2000; pp. 1-280.

Soules et al.; "Metadata Efficiency in a Comprehensive Versioning File System;" May 2002; CMU-CS-02-145; School of Computer Science, Carnegie Mellon University, Pittsburgh, PA 15213; 33 pages.

Linux Filesystems; Sams Publishing; 2002; pp. 17-22 and 67-71.

Bunyan, "Multiplexing in a BrightStor® ARCserve® Backup Release 11;" Mar. 2004; pp. 1-4.

Marks, "Network Computing;" Feb. 2, 2006; pp. 1-8.

Hill, "Network Computing;" Jun. 8, 2008; pp. 1-9.

Microsoft Computer Dictionary; 2002; Press Fifth Edition; 2 pages.

Retrieved from http://en.wikipedia.org/wiki/DEFLATE: DEFLATE; Jun. 19, 2008; pp. 1-6.

Retrieved from http://en.wikipedia.org/wiki/Huffman_coding; Huffman Coding; Jun. 8, 2008; pp. 1-11.

Retrieved from http://en.wikipedia.org/wiki/LZ77; LZ77 and LZ78; Jun. 17, 2008; pp. 1-2.

U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

REPLICATION OF VIRTUAL MACHINES

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes intercepting, at a file system level, an I/O directed to a file representing a virtual volume to be replicated to a replica volume at a replica site, translating a file offset of the file to a volume offset of the replica volume; and replicating the I/O to a replica volume using the volume offset.

In another aspect, an apparatus includes electronic hardware circuitry configured to intercept, at a file system level, an I/O directed to a file representing a virtual volume to be replicated to a replica volume at a replica site, translate a file offset of the file to a volume offset of the replica volume and replicate the I/O to a replica volume using the volume offset.

In a further aspect, an article includes a non-transitory computer-readable medium that stores computer-executable instructions. The instructions cause a machine to intercept, at a file system level, an I/O directed to a file representing a virtual volume to be replicated to a replica volume at a replica site, translate a file offset of the file to a volume offset of the replica volume and replicate the I/O to a replica volume using the volume offset.

DETAILED DESCRIPTION

Figure 1:
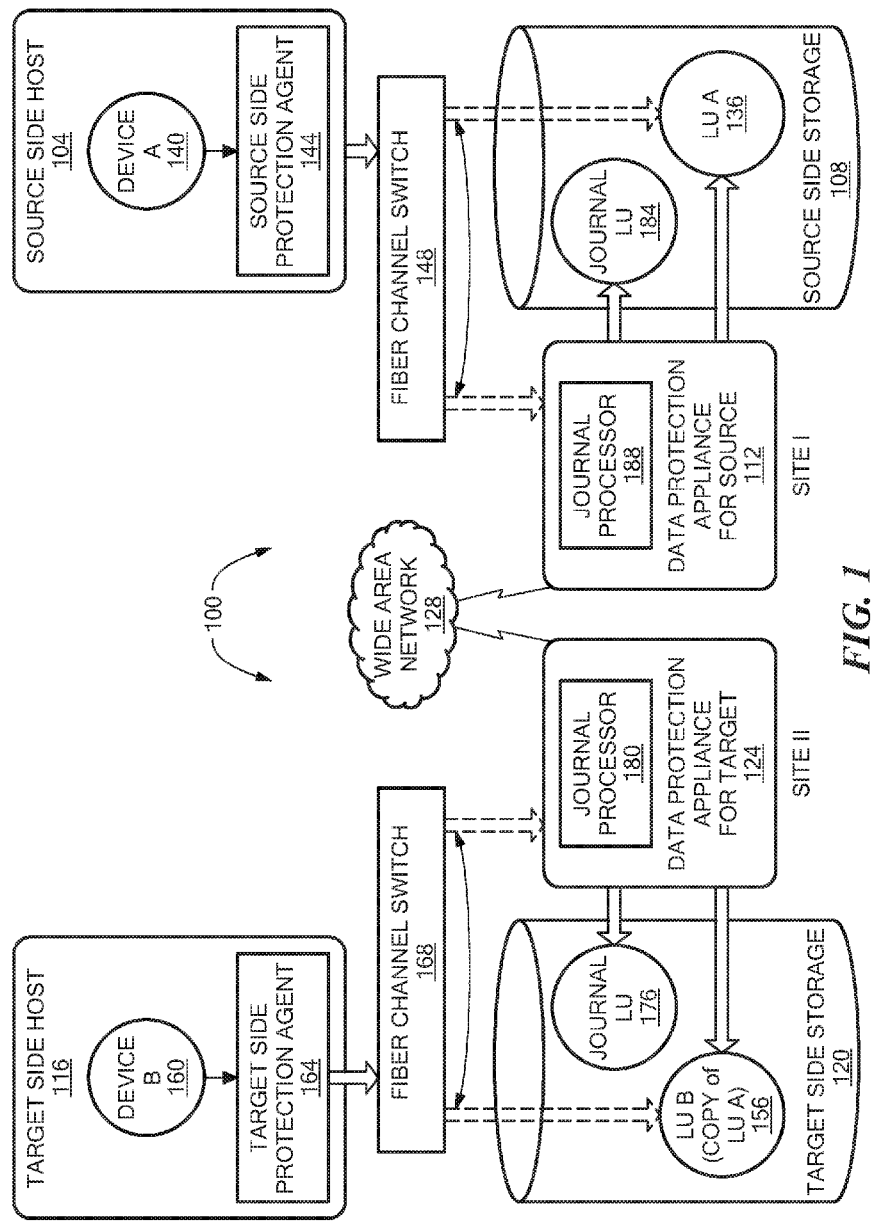
FIG. 1 is a block diagram of an example of a data protection system.

Described herein are techniques to perform replication of virtual machines. One technique uses a data protection agent (DPA) (also called a "splitter") to perform a virtual replication by storing a mapping at the splitter to be able to translate from a file ID and a file offset to a volume offset and split the data to the data protection appliance (DPA) at the replication site as an offset. Another technique uses the DPA at the replica site to perform replication asynchronously by splitting the data of all the files related to the replicated volume to the DPA. The virtual replication may be used in HYPER-V® and VMWARE® virtualization. The techniques described allow synchronous or asynchronous and heterogeneous replication of, for example, HYPER-V® to VMWARE®. Previous approaches required snapshot shipping (i.e., sending snapshots of a volume from the production site to the replication site) and mounting the snapshot of the virtual volume and replicating it at another volume; however, these previous approaches did not allow for synchronous or near synchronous replication.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SPLITTER ACKNOWLEDGEMENT—an acknowledgement from a DPA to the protection agent (splitter) that data has been received at the DPA; this may be achieved by an SCSI status command.

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

THIN PROVISIONING—thin provisioning involves the allocation of physical storage when it is needed rather than allocating the entire physical storage in the beginning. Thus, use of thin provisioning is known to improve storage utilization.

THIN LOGICAL UNIT—a thin logical unit is a logical unit that uses thin provisioning;

VIRTUAL LOGICAL UNIT—a virtual storage entity which is treated as a logical unit by virtual machines;

WAN—a wide area network that connects local networks and enables them to communicate with one another, such as the Internet.

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks maybe used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface.

Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identities LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: said the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgment before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
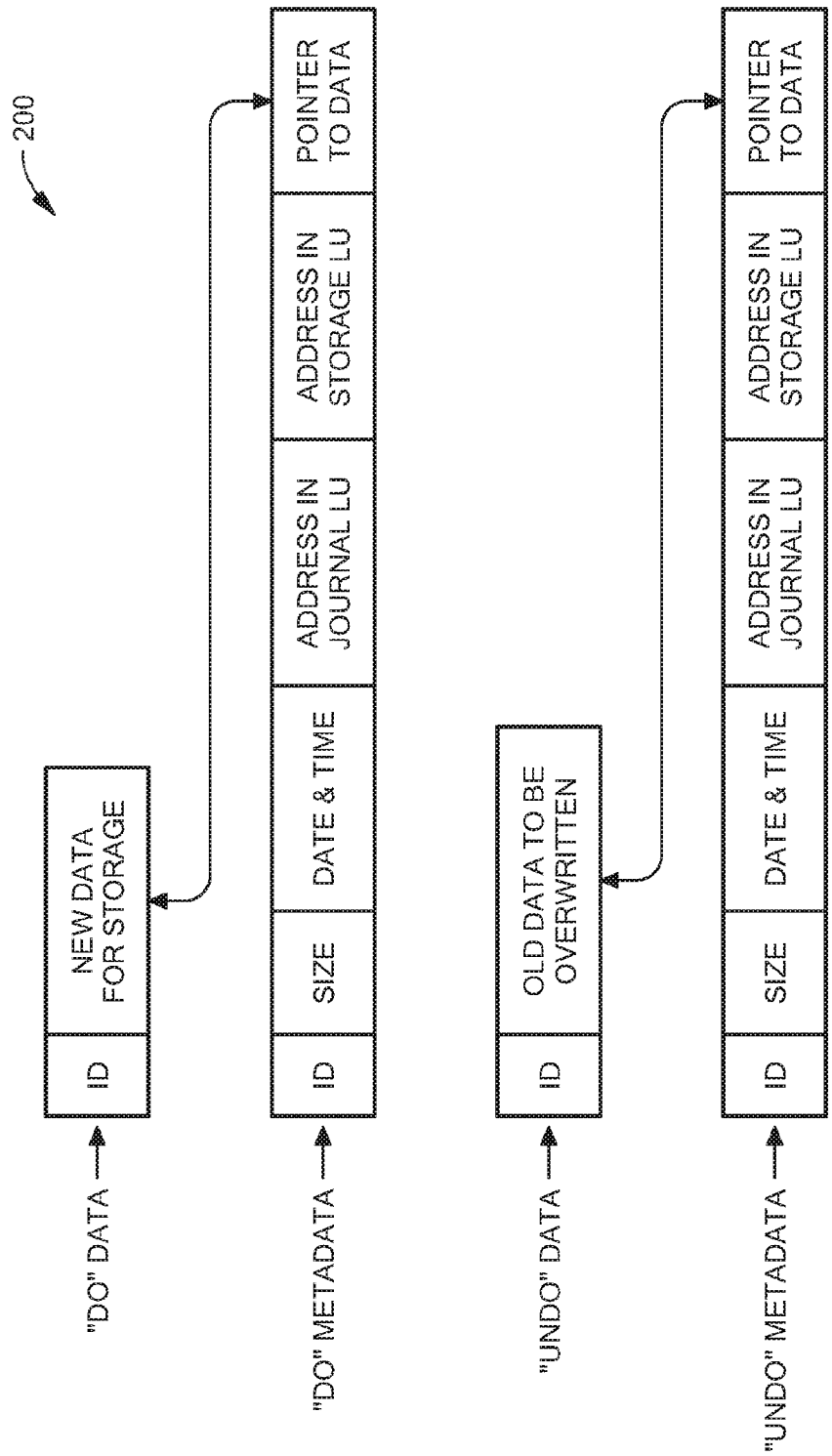
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
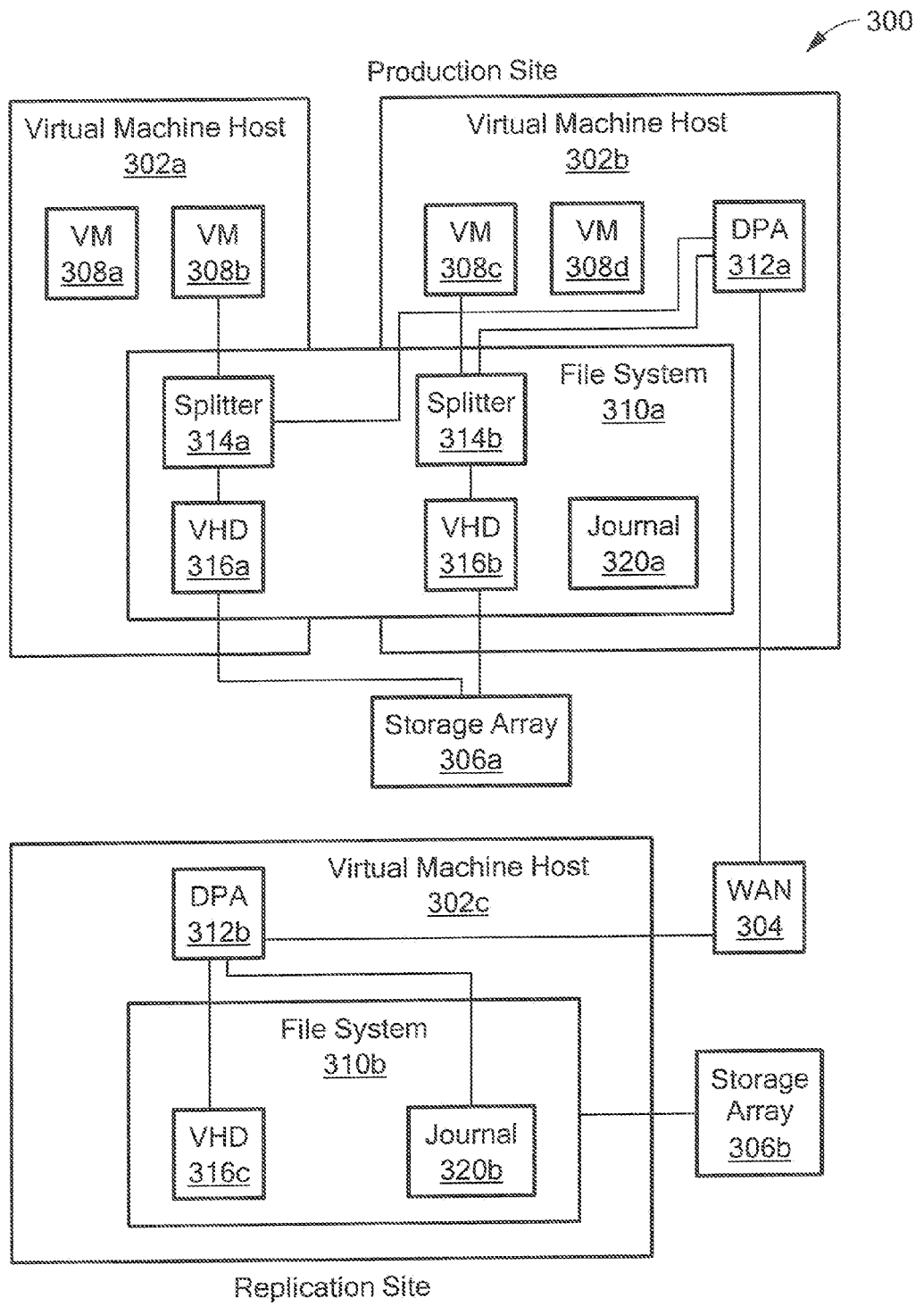
FIG. 3 is a block diagram of an example of the data protection system used in a virtual environment.

Referring to FIG. 3, an example of the data protection system used in a virtual environment is a data protection system 300. The system 300 includes virtual machine hosts (hypervisors) (e.g., a virtual machine hosts (hypervisors) 302a-302c), storage arrays (a storage array 306a, 306b) and a wide area network (WAN) 304. The virtual machine hosts (hypervisors) 302a, 302b and the storage array 306a are on the productions site and the virtual machine hosts (hypervisors) 302c and the storage array 306b are on the replication site. In one example, the virtual machine monitors 302a-302c is a MICROSOFT® HYPER-V®. In another example, the virtual machine monitors 302a-302c is a VMWARE® virtualization.

The virtual machine monitor 302a includes virtual machines (e.g., virtual machines 308a, 308b), a splitter 314a and virtual machine hard drive (VHD) (e.g., VHD 316a) and the virtual machine hosts (hypervisors) 302b includes a virtual data protection appliance (DPA) 312a, virtual machines (e.g., virtual machines 308c, 308d), a splitter 314a, VHDs (e.g., VHD 316b) and a journal virtual disk 320a. The splitters 314a, 314b, the VHDs 316a, 316b and the journal 320a are part of a file system 310a. In one example, the file system 310a is a clustered shared volume file system (Microsoft® CSVFS) or a VMWARE® file system (VMFS).

The virtual machine host (hypervisor) 302c includes a data protection appliance 312a, a splitter 314a, a virtual disk 316c and a journal 320b. The virtual disk 316c and the journal 320b are part of a file system 310b. In one example, the file system 310a is a CSVFS or a VMFS. The journals 320a, 320b are each VHDs.

In one example, an I/O from a VM 308a that is directed to a virtual disk 316a is split by the splitter 314a to the DPA 312b (via the DPA 312a and the WAN 304) recorded by the journal 320b to be stored on the virtual disk 316c.

Figure 4:
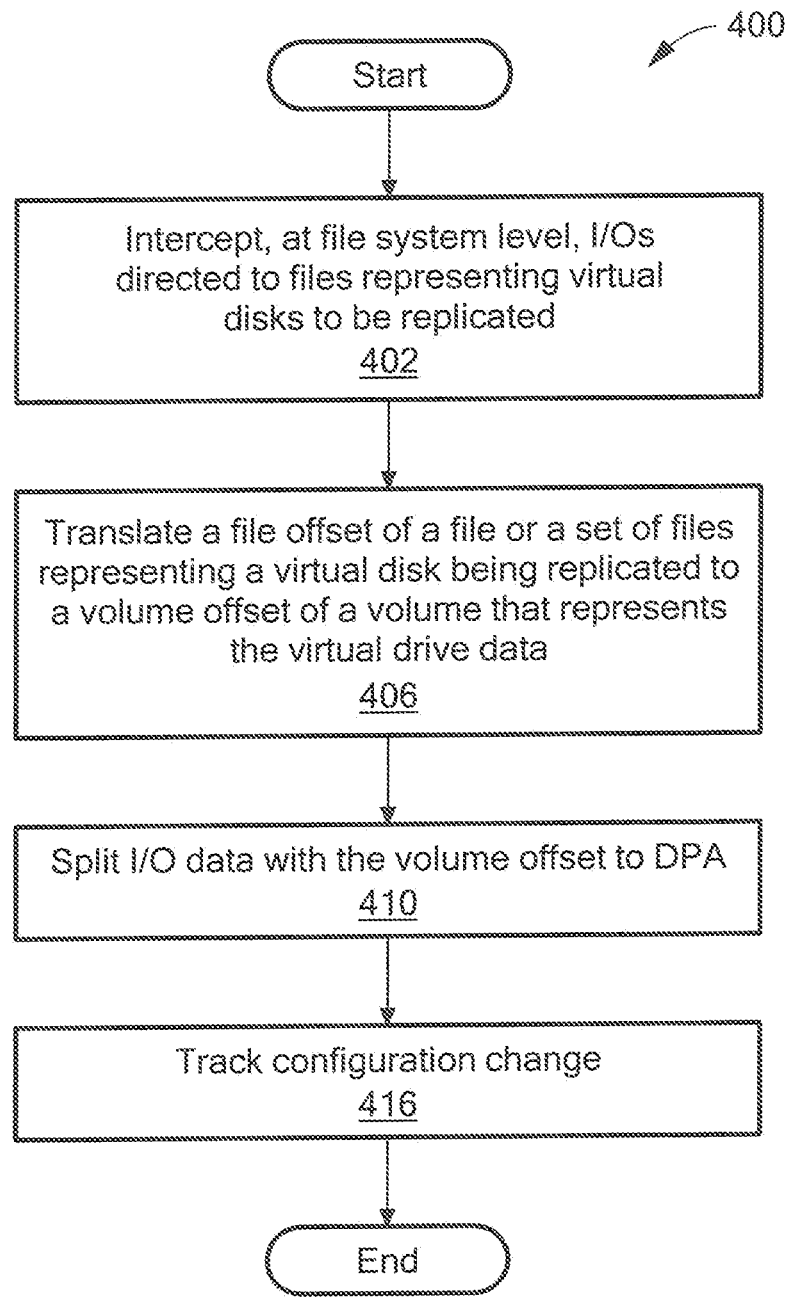
FIG. 4 is a flowchart of an example of a process to use a data protection agent (splitter) for virtual replication.

Referring to FIG. 4, an example of a process to perform virtual replication using a data protection agent is a process 400. Process 400 intercepts, at a file system level I/Os directed to files representing virtual disks to be replicated (402). In one example, the data protection agent at the source site filters I/Os directed to files in a CSVFS which is used in MICROSOFT® HYPER-V® for storing shared virtual machine hard drives (VHD) files representing volumes of virtual machine. In one particular example, an I/O from a VM 308a that is directed to a virtual disk 316a is intercepted by the splitter 314a.

Process 400 translates a file offset of a file or a set of files representing a virtual disk being replicated to a volume offset of a volume that represents the virtual drive data (406). For example, the splitter 314a (data protection agent) translates a file offset of a file or a set of files representing a VHD 316a being replicated to a volume offset of the volume represented by the VHD later to be written to replica VHD 316C that will include the replicated VHD.

In some embodiments the replica volume may be a LU in a physical system and not a VHD file and the offset after translation represents the offset in the replica LU.

A translation is needed because the mapping from an offset in a file to an offset in the logical volumes is not one-to-one, since the volume may be a thin volume (e.g., a thin logical unit), and thus the data in the file is compact and an offset in the file may translate to a different offset in the volume which the file represents. Also, a translation is needed when snapshots are generated. The virtual volume itself is kept on multiple files and the volume data is spread across the multiple files. A new file is generated whenever a snapshot is generated so that new I/Os will go to the new file. In one example, the mappings from the file offsets to offsets in the volume are stored in a map stored at the splitter (e.g., the splitter 314c).

Process 400 splits I/O data with the volume offset to the data protection appliance at the replica site (410). For example, the splitter 314a splits the I/O data and provides the volume offset (determined in processing block 406) to the data protection appliance 312b to store the data in the journal 320b.

Process 400 tracks configuration change (416). For example when a snapshot is generated and a new file representing part of the volume data is added, the change is tracked and the mapping is updated accordingly. In another example, if an I/O is written to an unallocated area in a thin volume, then new offsets are added to the file representing the volume for storing data for the newly allocated offset.

For example, at the replica site the VHD 316c may be mounted to the DPA 312b while the replication process is going and data from the journal 320b may be applied to the VHD 316c which the DPA 312b may see as an internal volume. In this case the offset to which the DPA 312b writes to will be the translated volume offset since the DPA 312b now sees the VHD 316c at the replica as a logical unit and not as a set of files.

Figure 5:
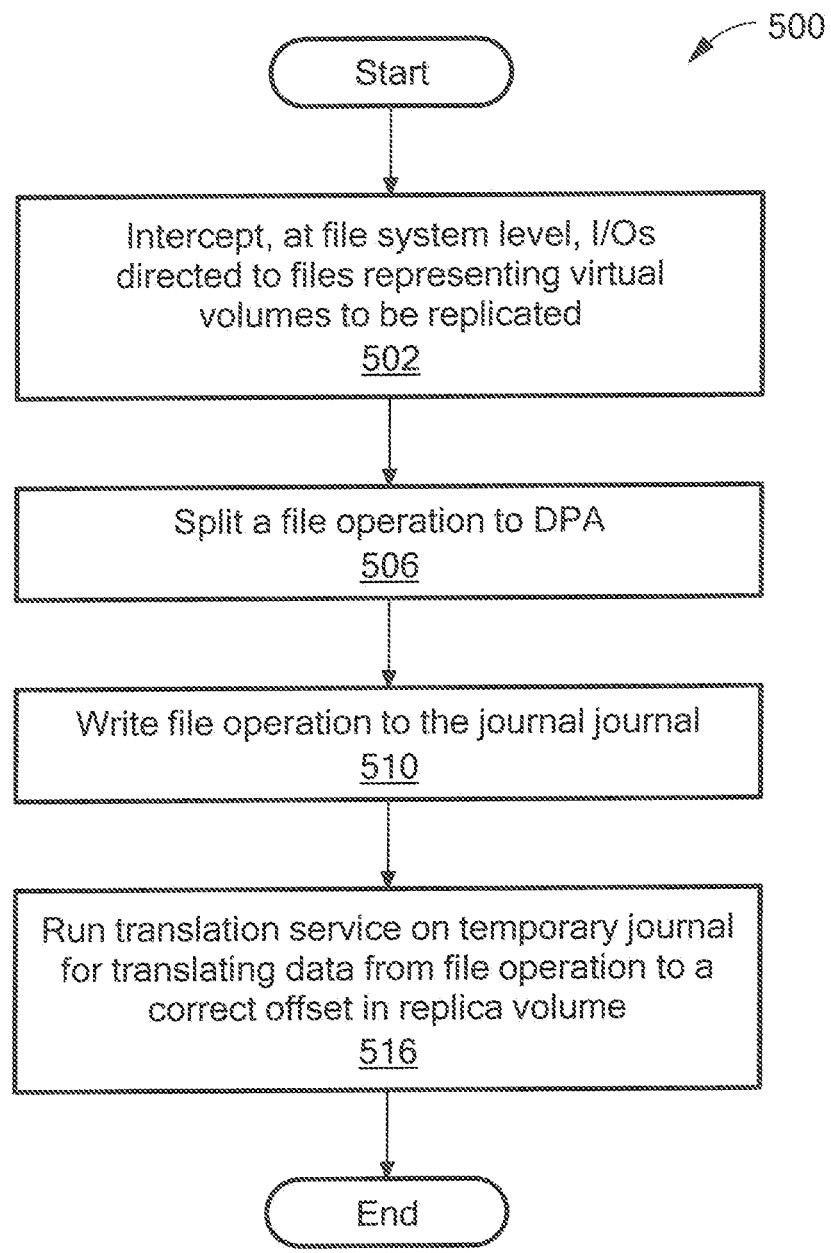
FIG. 5 is a flowchart of an example of a process to use a data protection agent at the replica site for virtual replication.

Referring to FIG. 5, an example of a process to perform virtual replication using a data protection appliance at the replica site is a process 500. Unlike process 400 in which the translation is performed synchronously, in process 500 the translation is performed asynchronously. For example, the file translation from an offset in the file to the volume is performed at a later time so that I/Os are not delayed.

Process 500 intercepts, at the file system level I/Os, directed to files representing virtual volumes to be replicated (502). In one example, processing block 502 is the same as processing block 402.

Process 500 splits a file operation to a data protection appliance (506). For example, the splitter 314a splits a file operation to the DPA 312b. In some examples, a file operation may include file create, file delete and write to a file operations. In one example, a metadata block is added, along with a file operation, which describes configuration changes to the files (e.g., generation of a snapshot and the new name of the snapshot file).

Process 500 writes file operation to a temporary journal (510). For example, the file operation (i.e., data for a write or modify) and the metadata block are both stored in the journal in a temp format. For example, a journal with the data in the temporary format may be the stream in the journal 320a. In one example, the data in the DO stream may be kept in a format of file operation metadata and only when data is applied to replica volume is it translated.

Process 500 runs a translation service on the temporary journal for translating the data from file operation to the correct offset in the replica volume (516).

For example when data is applied from the DO stream to the replica volume the translation service on the replica DPA translates the file operation into a volume offset operation and applies the data to the VHD 316c.

The data in the DO stream may be kept both in file format and volume offset format so that when data is rolled back in time the UNDO of the operation written to the DO stream may be in volume format.

Leveraging the file operations and the metadata blocks the system translates the operations to the correct volume operations. In one example the file operation and metadata operations are stored in the DO stream of the journal 320b, and when applied from the DO stream to the volume (VHD 316c) the translation occurs.

Figure 6:
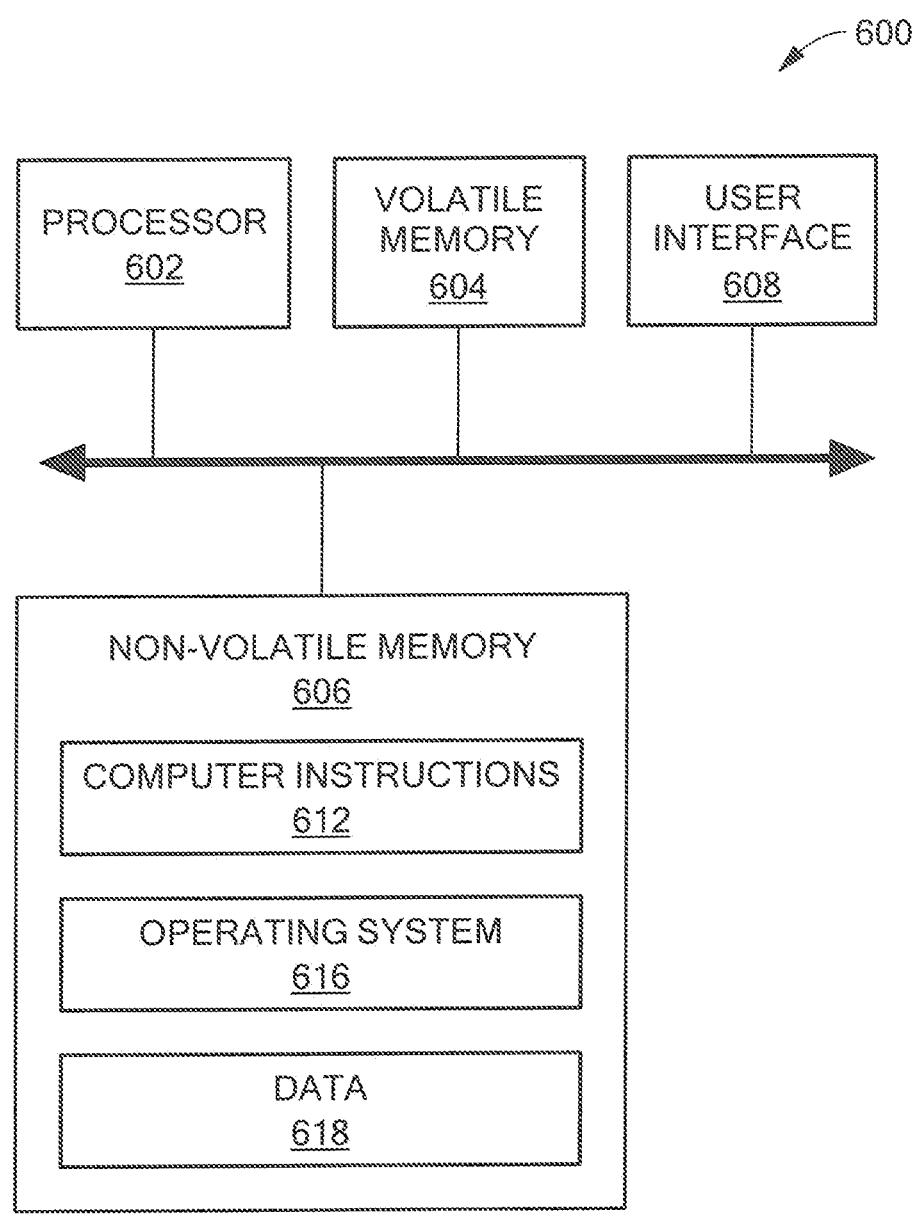
FIG. 6 is a computer on which any of the processes of FIGS. 4 and 5 may be implemented.

Referring to FIG. 6, in one example, a computer 600 includes a processor 602, a volatile memory 604, a non-volatile memory 606 (e.g., hard disk) and the user interface (UI) 608 (e.g., a graphical user interface, a mouse, a keyboard, a display, touch screen and so forth). The non-volatile memory 606 stores computer instructions 612, an operating system 616 and data 618. In one example, the computer instructions 612 are executed by the processor 602 out of volatile memory 604 to perform all or part of the processes described herein (e.g., processes 400 and 500).

The processes described herein (e.g., processes 400 and 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, processes 400 and 500 are not limited to the specific processing order of FIGS. 4 and 5, respectively. Rather, any of the processing blocks of FIGS. 4 and 5 may be re-ordered, combined or removed, performed in parallel or in serial, as necessary, to achieve the results set forth above.

The processing blocks (for example, in the processes 400 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
    intercepting, at a file system level, an I/O directed to a file offset of a first file stored at a first host, a virtual volume being stored as the first file;
    translating the file offset of the first file to a volume offset within a replica virtual volume stored as a second file on a second host; and
    replicating the I/O to the replica volume at the second host using the volume offset.

2. The method of claim 1 wherein translating the file offset of the file to the volume offset of the replica volume comprises translating synchronously the file offset of the file to the volume offset of the replica volume.

3. The method of claim 2 wherein translating synchronously comprises using a splitter at the replica site to map the file offset with the volume.

4. The method of claim 1 wherein translating the file offset of the file to the volume offset of the replica volume comprises translating asynchronously the file offset of the file to the volume offset of the replica volume.

5. The method of claim 4 wherein translating asynchronously comprises:
    splitting a file operation to a data protection appliance at the replica site;
    writing the file operation to a journal or a redo log; and
    running a translation service on the journal to translate the file operation to the volume offset in the replica volume.

6. The method of claim 5, further comprising adding a data block to record metadata information associated with tracking the file offset with the volume offset.

7. An apparatus, comprising:
    electronic hardware circuitry configured to:
        intercept, at a file system level, an I/O directed to a file offset of a first file stored at a first host, a virtual volume being stored as the first file;
        translate the file offset of the first file to a volume offset within a replica virtual volume stored as a second file on a second host; and
        replicate the I/O to the replica volume at the second host using the volume offset.

8. The apparatus of claim 7, wherein the circuitry comprises at least one of a processor, a memory, a programmable logic device or a logic gate.

9. The apparatus of claim 7 wherein the circuitry configured to translate the file offset of the file to the volume offset of the replica volume comprises circuitry configured to translate synchronously the file offset of the file to the volume offset of the replica volume.

10. The apparatus of claim 9 wherein the circuitry configured to translate synchronously comprises circuitry configured to use a splitter at the replica site to map the file offset with the volume.

11. The apparatus of claim 7 wherein the circuitry configured to translate the file offset of the file to the volume offset of the replica volume comprises circuitry configured to translate asynchronously the file offset of the file to the volume offset of the replica volume.

12. The apparatus of claim 11 wherein the circuitry configured to translate asynchronously comprises circuitry configured to:
    split a file operation to a data protection appliance at the replica site;
    write the file operation to a journal or a redo log; and
    run a translation service on the journal to translate the file operation to the volume offset in the replica volume.

13. The apparatus of claim 12, further comprising circuitry configured to add a data block to record metadata information associated with tracking the file offset with the volume offset.

14. An article comprising:
    a non-transitory computer-readable medium that stores computer-executable instructions, the instructions causing a machine to:
        intercept, at a file system level, an I/O directed to a file offset of a first file stored at a first host, a virtual volume being stored as the first file;
        translate the file offset of the first file to a volume offset within a replica virtual volume stored as a second file on a second host; and
        replicate the I/O to the replica volume at the second host using the volume offset.

15. The article of claim 14 wherein the instructions causing the machine to translate the file offset of the file to the volume offset of the replica volume comprises instructions causing the machine to translate synchronously the file offset of the file to the volume offset of the replica volume.

16. The article of claim 15 wherein the instructions causing the machine to translate synchronously comprises instructions causing the machine to use a splitter at the replica site to map the file offset with the volume.

17. The article of claim 14 wherein the instructions causing the machine to translate the file offset of the file to the volume offset of the replica volume comprises instructions causing the machine to translate asynchronously the file offset of the file to the volume offset of the replica volume.

18. The article of claim 17 wherein the instructions causing the machine to translate asynchronously comprises instructions causing the machine to:
   split a file operation to a data protection appliance at the replica site;
   write the file operation to a journal or a redo log; and
   run a translation service on the journal to translate the file operation to the volume offset in the replica volume.

19. The article of claim 18, further comprising instructions causing the machine to add a data block to record metadata information associated with tracking the file offset with the volume offset.

* * * * *